Jan. 18, 1966   F. M. WHITE   3,229,956
DIAPHRAGM FLUID VALVE
Filed March 2, 1962   2 Sheets-Sheet 1

INVENTOR.
FREDERICK M. WHITE
BY Woodling, Krost,
Granger and Rust
ATTORNEYS

Jan. 18, 1966

F. M. WHITE 3,229,956

DIAPHRAGM FLUID VALVE

Filed March 2, 1962

INVENTOR.
FREDERICK M. WHITE
BY Woodling, Krost,
Granger and Rust
ATTORNEYS

United States Patent Office 3,229,956
Patented Jan. 18, 1966

3,229,956
DIAPHRAGM FLUID VALVE
Frederick M. White, Lexington, Ohio, assignor to Stevens Manufacturing Company, Inc., a corporation of Ohio
Filed Mar. 2, 1962, Ser. No. 176,933
7 Claims. (Cl. 251—11)

The invention relates in general to fluid valves incorporating a diaphragm and, more particularly, to fluid valves having a diaphragm as a valve element to cooperate with a valve seat.

The present invention relates to a fluid valve wherein a valve seat is mounted in a housing and a diaphragm support is also carried in the housing with means mounting at least part of the peripheral edge of a flexible diaphragm on the diaphragm support such that fluid has access to both sides of the diaphragm, the diaphragm has an open position and has a closed position seated on the valve seat with actuator means in the housing to act on the diaphragm support to move the diaphragm in one of closing and opening directions.

An object of the invention is to provide a fluid valve with a diaphragm cooperable with a valve seat for sealing off fluid flow.

Another object of the invention is to provide a fluid valve which inherently has a snap action operation.

Another object of the invention is to provide a fluid valve which may be actuated slowly and yet the valve action is a snap action effect.

Another object of the invention is to provide a fluid valve with a diaphragm wherein fluid has access to both sides of the diaphragm so that fluid pressure within the valve housing acts to promote the sealed or closed condition of the valve and also acts to promote a snap action of the valve of the diaphragm valve element.

Another object of the invention is to provide a temperature responsive valve utilizing a diaphragm as the movable valve element.

Another object of the invention is to provide a self-contained valve and temperature responsive actuator for a diaphragm valve element.

Another object of the invention is to provide a valve wherein the movable valve element cooperating with the valve seat is capable of sealing with the valve seat despite different planes of support of the movable valve element.

Other objects and a fuller understanding of the invention may be had by referring to the following description and claims, taken in conjunction with the accompanying drawings, in which:

Figure 1:
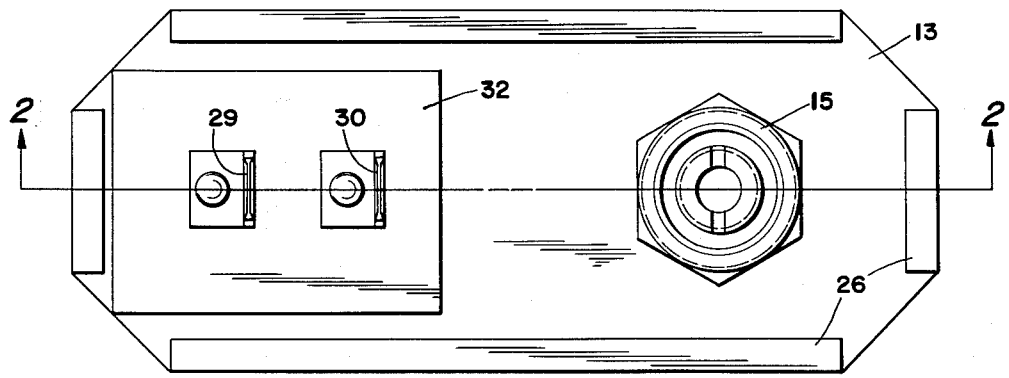
FIGURE 1 is a bottom view of a valve incorporating the invention.

The fluid valve of the present invention may be used in many different environments and, one particular environment is as used as a gas valve 11. The valve 11 is shown for purposes of illustration, but not limitation, as including a housing 12 which has a base 13 and a cover 14. The base 13 includes an outlet bushing 15 fixed and sealed into the base 13 in any suitable manner. External threads 16 are provided on the outlet bushing for connection to an external conduit. The outlet bushing 15 also is internally threaded at 17 to receive an adjustable hollow stud 18. An annular valve seat 19 is provided on the inner end of the hollow stud 18 and this valve seat is circular and preferably normal to the axis of the stud 18. A screw driver slot 20 is provided in the outer end of the stud 18 to adjust the position of the valve seat 19 within the housing 12. The internal threads 17 may be sealed to the hollow stud 18 by any suitable means, such as pipe dope or other sealant.

Figure 2:
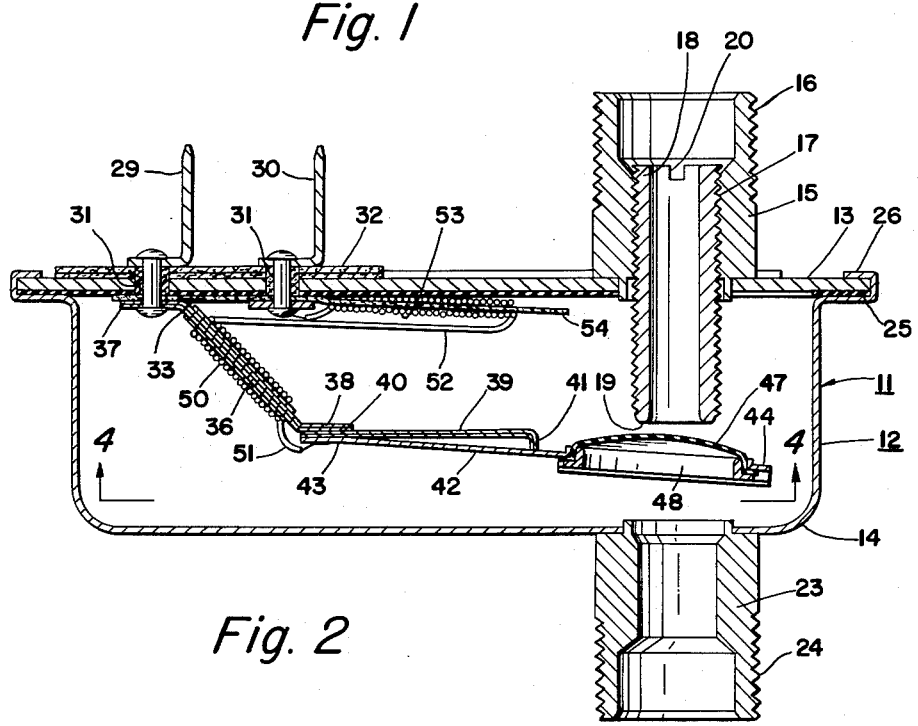
FIGURE 2 is a longitudinal section on line 2—2 of FIGURE 1.

The housing 12 includes an inlet bushing 23 at any suitable location and, as shown in FIGURES 1 and 2, this inlet bushing is co-axial with the outlet bushing 15, and mounted through the cover 14. This inlet bushing 23 is externally threaded at 24 to receive an external conduit for supply of fluid, in this case gas, to the sealed housing 12. The housing 12 is provided with a cover gasket 25 and the edges 26 of the cover are crimped over the base 13 to provide the sealed housing 12.

First and second electrical terminals 29 and 30 are provided in the housing 12 and are preferably mounted in the base 13. These electrical terminals are insulated from the base 13 by insulated bushings 31 and external and internal insulating plates 32 and 33, respectively.

A control bimetal 36 has first and second ends 37 and 38, respectively, with the first end 37 fixed on the first terminal 29. These two ends 37 and 38 are offset at about a 45 degree angle relative to the main body of the control bimetal 36 and, as a result, the control bimetal 36 extends at about a 45 degree angle relative to the base 13. An ambient compensation bimetal 39 has first and second ends 40 and 41, respectively, with the first end 40 fixed in any suitable manner, such as spot welding, to the second end 38 of the control bimetal 36. A metal leaf spring 42 has first and second ends 43 and 44, respectively, with the first end 43 fixed to the first end 40 of the ambient compensation bimetal 39. This connection may be by any suitable means, such as by spot welding. It will be noted that in effect, the leaf spring 42 is mounted on the outboard end 38 of the control bimetal 36.

The outboard end 44 of the leaf spring 42 may be considered a diaphragm support and an aperture 45 is formed in this leaf spring 42. This aperture 45 is preferably formed by a circular down-turned flange 46. A flexible diaphragm 47 is mounted on the outboard end 44 of the leaf spring 42. This flexible diaphragm may be of any suitable material and thin silicone rubber has been found to be suitable for use in gas valves with temperatures up to about 500 degrees working temperature. This diaphragm 47 may be square in plan view and held in the aperture 45 of the circular flange 46 by a hollow flanged ring 48 pressed into the aperture 45. This squeezes the peripheral edges of the diaphragm 47 between the flange 46 and the ring 48. This mounting of the diaphragm 47 is preferably in such a manner that it is slightly loose rather than stretched across the ring 48. The metal leaf spring 42 has two opposite upstanding edges 49 which are bent down on the hollow ring 48 to hold same in place.

A heater wire 50 is an insulated wire mounted on the control bimetal 36 and has first and second ends 51 and 52, respectively. The first end 51 of this heater wire is connected to the outboard end of the control bimetal 36 and, as shown, may be connected to the inboard end of the leaf spring 42 by any suitable means such as spot welding. The second end 52 of the heater winding 50 is connected through a dropping resistor 53 to the second terminal 30. This dropping resistor 53 may or may not be necessary, depending upon the diameter of the resistor heater wire 50, the operating voltage for the heater wire 50 and the desired electrical and thermal characteristics. The dropping resistor 53 may be more of the same wire 50 and may be wound on an extension 54 of the insulating plate 33.

FIGURE 2 shows the valve 11 as being of the normally open type and in this construction, the low expansion side of the control bimetal 36 is disposed closer to the base 13 than the high expansion side. The ambient compensation bimetal 39 is reversely connected to the control bimetal 36 and, accordingly, the high expansion side is positioned closer to the base 13 than the low expansion side. The ambient compensation bimetal may be in the form of a truncated triangle for added stiffness, and the leaf spring 42 may be made of any suitable material such as stainless steel to withstand high temperature operation. The leaf spring 42 is preferably more flexible than the ambient compensation bimetal 39 so that flexing of this bimetal 39 with temperature results in more or less bowing or deflection of the leaf spring 42. FIGURE 2 shows the normal or inoperative position of the bimetals 36 and 39 and the spring 42 has a slight bowing or deflection.

The valve 11 may be operated on low voltage for safety such as 12 to 28 volts, or may be operated on normal line voltage, e.g. 115 volts. When such voltage is applied to the terminals 29 and 30, the heater wire 50 is heated and the control bimetal 36 is further heated by conduction current therethrough to deflect toward the base 13. This moves the diaphragm support 44 toward the valve seat 19 and, as a result, the diaphragm 47 moves in a closing direction. Gas flow is from the inlet 23 to the outlet 15 and assuming that there is fluid flow therethrough, this fluid flow acts like a venturi all around the annular valve seat 19 as the diaphragm 47 approaches this valve seat 19. Accordingly, this venturi effect creates a pull on the diaphragm 47 to slightly stretch it toward and make it seat upon the annular valve seat 19. This closing of the diaphragm 47 on the seat 19 may take place quite quickly and it has been found that it will occur within two seconds after energization of the heater 50. Preferably, the heating of the control bimetal 36 is sufficient with the voltage applied to cause the diaphragm support 44 to move to a position similar to that shown in FIGURE 3. In this position, the diaphragm support 44 is in a plane closer to the base 13 than the plane of the valve seat 19. This slightly stretches the diaphragm 47 over the valve seat 19 to assure a good seal thereat to close the valve 11. Additionally, the support of the diaphragm 47 is such that it is supported at its peripheral edge with free fluid access to both sides of the diaphragm 47 and, thus, fluid pressure within the housing 12 also aids to seal off the diaphragm 47 and valve seat 19. Still further, this pressure within the housing 12 is a differential pressure which aids the venturi effect to promote a quick acting closing of the valve 11.

The valve 11 may be used in a gas range or stove where the ambient temperature may be quite high, considerably higher than the approximately 70° F. usually taken as room temperature. Accordingly, as the ambient temperature increases, the control bimetal 36 will move toward the base 13. However, the ambient compensation bimetal 39 concurrently moves away from the base 13 and, thus, the outer end 41 of the ambient compensation bimetal 39 deflects the leaf spring 42 still further so that the diaphragm 47 remains in a substantially constant position relative to the valve seat 19 despite changes in ambient temperature. It will be noted that this movement of the two bimetals 36 and 39 with increasing temperature will cause them to be disposed at a slightly greater angle therebetween, this angle being shown as about 135° in FIGURE 2. Thus, even though the relative position of the diaphragm 47 remains generally constant, the attitude of the diaphragm support 44 will change slightly, with the plane of the diaphragm support 44 tending to depart more from the plane of the valve seat 19. The present invention is such as to provide a construction which is satisfactorily operable despite this change in the planar attitude of the diaphragm 47. Because of the flexibility of the diaphragm 47, this diaphragm effectively seals against the valve seat 19 even though the plane of the diaphragm support 44 is tilted out of the plane of the valve seat 19. The diaphragm 47 merely shifts slightly sideways relative to the valve seat 19 to make the diaphragm taut all around the valve seat 19 when in the position shown in FIGURE 3, and this provides the effective sealing off of fluid flow. Still further, this slight sideways motion provides a slight wiping action between the diaphragm 47 and the valve seat 19 to, thus, aid in maintaining the valve seat 19 clean and free from foreign matter.

Also, it will be noted that the aperture 45 of the diaphragm support 44 need not be concentric with the axis of the valve seat 19. Even despite such eccentricity, the diaphragm 47 will properly seal on the seat 19. Thus, this permits slight misalignment during manufacture permitting more rapid and economical assembly for more economical manufacturing costs.

Figure 3:
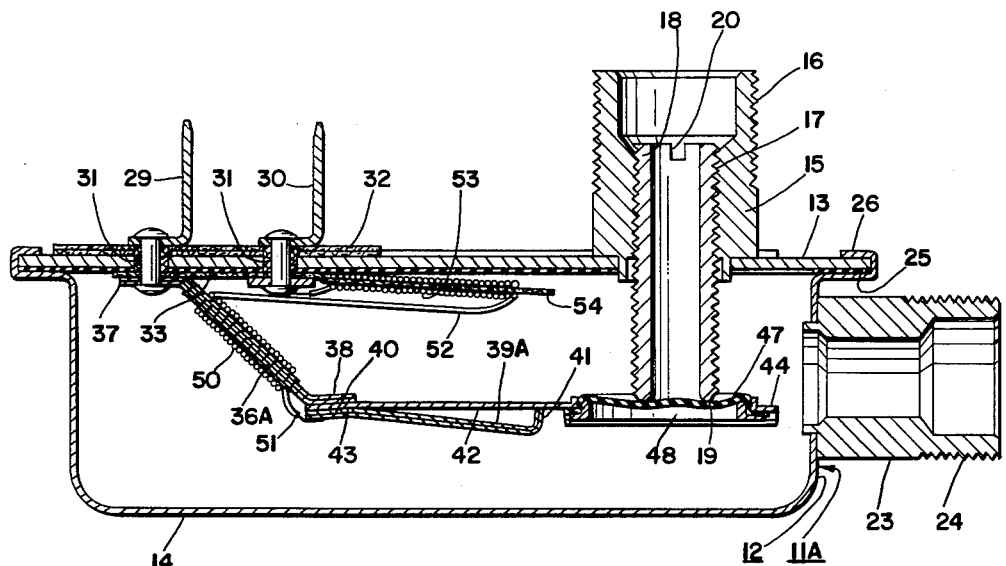
FIGURE 3 is a view similar to FIGURE 2 but showing an alternative construction of a normally closed valve.
Figure 4:
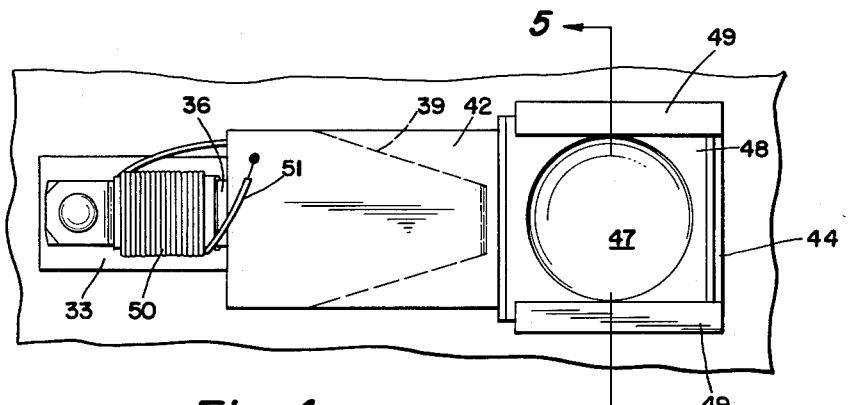
FIGURE 4 is a partial sectional view on line 4—4 of FIGURE 2.
Figure 5:
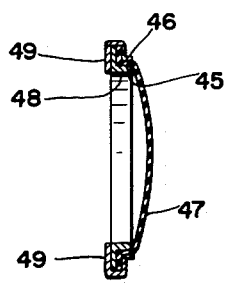
FIGURE 5 is a partial sectional view on line 5—5 of FIGURE 4.

FIGURE 3 shows an alternative construction of a valve 11A wherein the inlet bushing 23 may be at a different location in the cover 14 and is shown at the end of the cover 14. Also, FIGURE 3 shows the valve 11A as being in the closed position and, hence, this may be a normally closed valve. With this type of valve, the ambient compensation bimetal 39A is still reversely connected to the control bimetal 36A but, in this normally closed construction, the high expansion side of the control bimetal 36A is positioned closer to the base 13 and the low expansion side of the ambient compensation bimetal 39A is positioned closer to the base 13. This may be accomplished by placing the ambient compensation bimetal 39A on the opposite side of leaf spring 42, as shown. Upon heating, the control bimetal 36A will move away from the base 13. This movement is in the opening direction and the diaphragm support 44 will move away from the valve seat 19 until a point is reached whereat the diaphragm 47 is stretched away from the valve seat 19. The action of the control bimetal 36A, upon heating, is a creep action and this creep action will stress the control bimetal 36A and spring 42 which stress is resisted by the fluid pressure within the housing 12 acting on the inlet side of the diaphragm 47. When the stress developed by heating of the control bimetal 36A is sufficient, this will suddenly snap the diaphragm 47 away from the valve seat 19 to open the valve. Again, this opening is found to occur within two seconds of application of voltage. The above described action is similar to that for the opening of the valve 11 of FIGURE 2 upon de-energization of the heater winding 50. Also, the previously described closing action of the valve 11 of FIGURE 2 is similar to the closing action which will take place upon de-energization of the heater winding 50 of the valve 11A of FIGURE 3.

The closing of the valve 11A is accomplished by de-energizing the heater wire 50. As the control bimetal 36A cools, it deflects toward the base 13. As the diaphragm 47 nears the valve seat 19, the venturi effect of the fluid flow pulls the diaphragm 47 quickly into engagement with the seat 19. The force of the venturi effect will stress the leaf spring 42 to cause it momentarily to pull away from the end 41 of the ambient compensation bimetal 39A. Since this bimetal 39A is placed on the opposite side of the leaf spring 42, compared to the disposition in FIGURE 2, this momentary separation is permitted, and aids the quickness of the valve action.

It will be noted that both valves 11 and 11A of FIGURES 2 and 3 are provided with means to heat a bimetallic or thermoresponsive material to actuate the valve in one of opening and closing directions. Thus, the entire valve 11 or 11A becomes a self-contained valve and actuator means. Also, the valves 11 or 11A may be mounted in any position and yet are completely operative.

The creep action movement of the control bimetal 36 or 36A results in a quick action or snap action effect of the diaphragm 47 relative to the valve seat 19. This is aided by the diaphragm being rather loosely mounted by at least a part of the peripheral edge of the diaphragm and is also aided by fluid access to both sides of the diaphragm and by the venturi effect of the gas flow between the diaphragm 47 and valve seat 19 in the closing direction. It is also aided by the fact that energy can be stored in the creep action control bimetal 36 and in the leaf spring 42 until enough force is available to snap the diaphragm 47 away from the valve seat 19.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A fluid valve comprising, in combination, a housing,
a valve seat in said housing,
a diaphragm support carried in said housing,
a flexible diaphragm having a peripheral edge,
means mounting at least part of said edge of said diaphragm on said diaphragm support with said diaphragm loosely supported with fluid access to both sides of said diaphragm,
said diaphragm having an open position and having a closed position seated on said valve seat,
actuator means in said housing carrying said diaphragm support to move said diaphragm in one of closing and opening directions, said actuator means including a control bimetal and an ambient temperature compensating bimetal carried thereon and establishing the plane of said diaphragm mounting means at a small angle relative to the plane of said valve seat with ambient temperature changes.

2. A fluid valve comprising, in combination, a housing,
a valve seat in said housing,
a diaphragm support carried in said housing,
a flexible diaphragm having a peripheral edge,
means mounting at least part of said edge of said diaphragm on said diaphragm support with said diaphragm loosely supported with fluid access to both sides of said diaphragm,
said diaphragm having an open position and having a closed position seated on said valve seat,
temperature responsive means mounted in said housing and acting on said diaphragm support,
means to heat said temperature responsive means to move said diaphragm in one of closing and opening directions, compensating means in said temperature responsive means establishing the plane of said diaphragm mounting means at a small angle relative to the plane of said valve seat with ambient temperature changes,
and said diaphragm support having a diameter substantially larger than said valve seat and together with said loosely supported diaphragm compensating for said small angle difference of said two planes to still effect sealing of said diaphragm on said valve seat.

3. A fluid valve comprising, in combination, a housing,
an annular valve seat in said housing,
a diaphragm support carried in said housing,
a flexible diaphragm having a peripheral edge,
means mounting at least part of said edge of said diaphragm on said diaphragm support with said diaphragm loosely supported with fluid access to both sides of said diaphragm,
said diaphragm having an open position and having a closed position seated on said valve seat as aided by fluid pressure within said housing acting on said diaphragm,
temperature responsive means mounted in said housing and carrying said diaphragm support,
heating means mounted in heat exchange relationship with said temperature responsive means to move said diaphragm in one of closing and opening directions, the opening direction of movement of said diaphragm moving same away from said valve seat against the fluid pressure within said housing to remove said diaphragm from said seat, said temperature responsive means including a control bimetal and an ambient temperature compensating bimetal carried thereon and establishing the plane of said diaphragm mounting means at a small angle relative to the plane of said valve seat with ambient temperature changes,
and said diaphragm support having a diameter substantially larger than said valve seat and together with said loosely supported diaphragm compensating for said small angle difference of said two planes to still effect sealing of said diaphragm on said valve seat.

4. A fluid valve comprising, in combination, a housing,
fluid inlet and outlet means in said housing,
an annular valve seat on one of said inlet and outlet means,
a control bimetal carried in said housing, an ambient temperature compensating bimetal carried by said control bimetal,
a leaf spring carried by said control bimetal and acted on by said compensating bimetal,
a diaphragm support carried by said leaf spring,
a flexible diaphragm having edges,
means mounting the edges of said diaphragm on said diaphragm support with said diaphragm loosely supported and with free fluid access to both sides of said diaphragm,
a heater winding mounted in heat exchange relationship with said control bimetal,
said diaphragm having an open position and having a closed position seated on said valve seat,
and means to energize said heater winding to deflect said control bimetal and said diaphragm in one of closing and opening directions.

5. A fluid valve comprising, in combination, a housing,
a fluid inlet and outlet in said housing,
a threaded aperture in said outlet,
a threaded hollow stud in said threaded aperture and with the inner end thereof extending into said housing,
an annular valve seat on the inner end of said hollow threaded stud,
a control bimetal mounted by one end in said housing,
an ambient compensation bimetal mounted on the outboard end of said control bimetal and extending generally longitudinally in said housing,
an aperture ring moved by said ambient compensation bimetal,
a flexible diaphragm of thin silicone rubber mounted on said aperture ring and covering said aperture ring and adapted to cooperate with said valve seat,
a heater winding mounted on said control bimetal and having two ends,
first and second electrical terminals insulatedly mounted in said housing,
means to connect said heater winding ends to said terminals,
the ambient compensation bimetal being reversely connected to said control bimetal for opposing movements upon concurrent heating,
said bimetals having inherent resiliency and said threaded stud being adjustable relative to said diaphragm,
said diaphragm having an open position and having a closed position seated on said valve seat as aided by fluid pressure within said housing,
and means to energize said heater winding to deflect said control bimetal in one of closing and opening directions,
the opening direction of movement of said control bimetal urging said diaphragm away from said valve seat against the fluid pressure within said housing to remove said diaphragm from said seat with a snap action, the closing direction of movement of said control bimetal moving said diaphragm toward said seat and the venturi effect of the fluid flow between said diaphragm and said seat aiding in a quick action closing of said diaphragm on said seat.

6. A diaphragm sealing gas valve comprising, in combination, a housing,
   a gas conduit inlet in said housing,
   a gas conduit outlet in said housing,
   a threaded aperture in said outlet,
   a threaded hollow stud in said threaded aperture and with the inner end thereof extending into said housing,
   an annular valve seat on the inner end of said hollow threaded stud,
   first and second electrical terminals insulatedly mounted in said housing,
   a control bimetal mounted in said housing on said first electrical terminal in electrical contact therewith,
   an ambient compensation bimetal mounted on the outboard end of said control bimetal and extending generally longitudinally in said housing,
   a spring blade mounted on said control bimetal and acted on and deflected by said ambient compensation bimetal,
   a diaphragm aperture in the outboard end of said spring blade,
   a flexible diaphragm of thin silicone rubber mounted on said spring blade and covering said diaphragm aperture and adapted to cooperate with said valve seat,
   a heater winding mounted on said control bimetal and having first and second ends with said first end connected to the outboard end of said control bimetal,
   said second end of said heater winding being connected to said second electrical terminal,
   the high expansion side of said control bimetal being disposed closer to said outlet than the low expansion side thereof,
   the ambient compensation bimetal being reversely connected to said control bimetal,
   said bimetals having inherent resiliency and said threaded stud being adjusted to maintain said diaphragm in resilient sealing engagement with said annular seat at room temperature of said gas valve,
   energization of said heater winding effecting heating of said control bimetal to urge said diaphragm away from said valve seat against the gas pressure within said housing to remove said diaphragm from said seat with a snap action upon sufficient heating of said control bimetal,
   a removal of energization of said heater winding effecting cooling of said control bimetal to move said diaphragm toward said seat and the venturi effect of the gas flow between said diaphragm and said seat aiding in a quick action closing of said diaphragm on said seat.

7. A diaphragm sealing gas valve comprising, in combination, a base,
   a cover coacting with said base to form a housing therewith,
   a gas conduit inlet in said housing,
   a gas conduit outlet in said housing,
   a threaded aperture in said outlet,
   a threaded hollow stud in said threaded aperture and with the inner end thereof extending into said housing,
   an annular valve seat on the inner end of said hollow threaded stud,
   first and second electrical terminals insulatedly mounted in said housing,
   a control bimetal mounted in said housing on said first electrical terminal in electrical contact therewith,
   said control bimetal extending at about a 45 degree angle relative to said base,
   an ambient compensation bimetal mounted on the outboard end of said control bimetal and extending generally parallel to said base,
   a spring blade mounted on said control bimetal and acted on by said ambient compensation bimetal,
   a diaphragm aperture in the outboard end of said spring blade,
   a flexible diaphragm of thin silicone rubber mounted on said spring blade and covering said diaphragm aperture and adapted to cooperate with said valve seat,
   a heater winding wrapped around said control bimetal and having first and second ends with said first end connected to the outboard end of said control bimetal,
   said second end of said heater winding being connected to said second electrical terminal,
   the low expansion side of said control bimetal being disposed closer to said outlet than the high expansion side thereof,
   the ambient compensation bimetal being reversely connected to said control bimetal,
   said bimetals having inherent resiliency and said threaded stud being adjusted to maintain said diaphragm in resilient sealing engagement with said annular seat at room temperature of said gas valve and aided by gas pressure in said housing,
   energization of said heater winding through said terminals effecting heating of said control bimetal to urge said diaphragm toward said valve seat and the venturi effect of the gas flow between said diaphragm and said seat aiding in a quick action closing of said diaphragm on said seat,
   and removal of energization of said heater winding effecting cooling of said control bimetal to move said diaphragm away from said seat against the gas pressure within said housing to remove said diaphragm from said seat with a snap action upon sufficient cooling of said control bimetal.

References Cited by the Examiner

UNITED STATES PATENTS

| | | | |
|---|---|---|---|
| 1,897,497 | 2/1933 | Pirani | 251—11 X |
| 2,101,991 | 12/1937 | Finley et al. | 251—175 X |
| 2,159,342 | 5/1939 | Persons | 236—68 X |
| 2,267,515 | 12/1941 | Wilcox et al. | 251—117 X |
| 2,583,795 | 1/1952 | Pawelsky et al. | 251—11 X |
| 3,109,480 | 11/1963 | Mieras | 251—11 X |

OTHER REFERENCES

Product Engineering: pages 146–150, February 1947 (silicone rubber).

M. CARY NELSON, *Primary Examiner.*

WILLIAM F. O'DEA, *Examiner.*